United States Patent
Osorio

(10) Patent No.: US 7,570,180 B2
(45) Date of Patent: Aug. 4, 2009

(54) METHOD FOR SYNTACTICALLY ANALYZING A BIT STREAM USING A SCHEMA AND A METHOD OF GENERATING A BIT STREAM BASED THEREON

(75) Inventor: Roberto Osorio, Santiago de Compostela (ES)

(73) Assignees: Koninklijke Philips Electronics N.V., Eindhoven (NL); Interuniversitair Microelektronica Centrum (IMEC), Leuven (BE)

(*) Notice: Subject to any disclaimer, the term of this patent is extended or adjusted under 35 U.S.C. 154(b) by 919 days.

(21) Appl. No.: 10/853,796

(22) Filed: May 25, 2004

(65) Prior Publication Data

US 2005/0031031 A1 Feb. 10, 2005

Related U.S. Application Data

(63) Continuation of application No. PCT/BE02/00178, filed on Nov. 26, 2002.

(60) Provisional application No. 60/333,645, filed on Nov. 26, 2001.

(51) Int. Cl.
*H03M 7/00* (2006.01)
*G06F 17/21* (2006.01)

(52) U.S. Cl. .................... 341/51; 715/234; 715/236

(58) Field of Classification Search .......... 341/51; 709/231; 715/201, 202, 204, 234, 236
See application file for complete search history.

(56) References Cited

U.S. PATENT DOCUMENTS 5,925,104 A * 7/1999 Elbers et al. ............. 709/231

6,873,740 B1 * 3/2005 Devillers et al. ............ 382/243

FOREIGN PATENT DOCUMENTS

| EP | 939545 A | 9/1999 |
|---|---|---|
| EP | 1028593 A | 8/2000 |
| EP | 1045315 A | 10/2000 |
| WO | WO 9905602 A | 2/1999 |
| WO | WO 0169936 A | 9/2001 |
| WO | WO 02063494 A | 8/2002 |
| WO | WO 02069187 A | 9/2002 |

(Continued)

OTHER PUBLICATIONS

International Preliminary Examination Report for PCT/BE02/00178, Aug. 2004 WIPO.*

(Continued)

*Primary Examiner*—Howard Williams

(57) ABSTRACT

A method and apparatus for transforming a description of an encoded bit stream is described. The encoded bit stream comprises data packets and the description is written in a markup language such as BSDL. A group of one or more data packets is described in the description by an element, the element having at least one attribute containing a transformation tag. The description is scanned to check for a transformation tag in accordance with a predetermined condition and an adapted description is generated. The transformation of multimedia files is described to provide for content scalability. The adaptation approach works as follows: instead of directly adapting the bit stream, the description of the bit stream is modified, by use of so-called style sheets. Therefore, from the modified description a binary form file can be generated.

9 Claims, 10 Drawing Sheets

```
<vtc_file xmlns:xsi="http://www.w3.org/2001/XMLSchema-instance"
 xmlns="urn:mpeg:mpeg4:vtc" xsi:schemaLocation="urn:mpeg:mpeg4:vtc VTC.xsd ">
 <main_header>
   <start_marker>000001BE</start_marker>
   <tiling_disable>1</tiling_disable>
   <texture_error_resilience_disable>0</texture_error_resilience_disable>
   <texture_object_id>0</texture_object_id>
   ...
 </main_header>
 <packet>
  <header>
   <packet_marker>1</packet_marker>
   <first_TU_0>0</first_TU_0>
   <last_TU_0>0</last_TU_0>
  </header>
  <startPayload>64</startPayload>
  <payload>bitstream.vtc#20-148</payload>
 </packet>
 ....
</vtc_file>
```

Fragment of BSDL Description for a VTC MQ-TD image.

FOREIGN PATENT DOCUMENTS

WO     WO03046756 A3 * 6/2003

OTHER PUBLICATIONS

Vetro et al, Object-based transcoding for adaptable video content delivery, IEEE Transactions on Circuits and Systems for Video Technology, Mar. 2001, vol. 11, No. 3, pp. 387-401.*

Villard, Authoring transformations by direct manipulation for adaptable multimedia presentations, Proceedings of the 2001 ACM Symposium on Document engineering, Atlanta, Georgia, USA, Session: Hypermedia and Graphics 2, pp. 125-134, Year of Publication: 2001.*

Eleftheriadas, Flavor: a language for media representation, Proceedings of the fifth ACM international conference on Multimedia table of contents, Seattle, Washington, United States, pp. 1-9, Year of Publication: 1997, ISBN:0-89791-991-2.*

Text of ISO/IEC 14496-2:2003 Information Technology—Coding of Audio-Visual Objects—Part 2: Visual—ISO/IEC JTC 1/SC 29/WG 11 N5546, Mar. 2003.

"Text of ISO/IEC FCD 15938-1 Information Technology—Multimedia Content Description Interface—Part 1 Systems" ISO/IEC JTC1/SC29/WGI1 MPEG01/N4001, XX, XX, Mar. 2001, pp. 1-2,I, XP001001465.

Text of ISO/IEC FDIS 21000-7:2004(E) Information Technology—Multimedia Framework (MPEG-21) Part 7: Digital Item Adaption—ISO/IEC JTC 1/SC 29/WG 11, Mar. 2004.

"The MPEG-4 Audio-Visual Compression Standard, Text of ISO/IEC 14496-5/FPDAM1," ISO/IEC JTC1/SC29/ WG11/MPEG99/N3309, Noordwijkerhout, Mar. 2000.

Cohen et al. "Deep Compression for Streaming Texture Intensive Animations," Proceedings of the SIGGRAPH 1999 annual conference on Computer graphics, pp. 261-267, 1999.

Delfosse et al., "The use of VTC error resilience for view-dependent texture decoding", ISO/IEC JTC1/SC29/WG11/ MPEG2001/m7580, Pattaya, Dec. 2001.

Deshpande et al., "HTTP streaming of JPEG2000 images" Proceedings International Conference on Information Technology: Coding and Computing, XX, XX, Apr. 2, 2001, pp. 15-19, XP002193324.

Devillers, "XML and XSLT Modeling for Multimedia Bitstream Manipulation" Philips, 'Online!—May 2001 pp. 1-2, XP002245841 Retrieved from the Internet: <URL:http://www10.org/cdrom/posters/1112.pdf>.

Lafruit et al., "3D Computational Graceful Degradation," Proceedings of ISCAS -Workshop and Exhibition on MPEG-4, pp. III-547-III-550, May 28-31, 2000.

Sodagar et al., "Scalable Wavelet Coding for Synthetic/Natural Hybrid Images," IEEE Transactions on Circuits and Systems for Video Technology, vol. 9, No. 2, pp. 244-254, Mar. 1999.

Zhao et al., "MPEG-4 FGS Video Streaming With Constant-Quality Rate Adaptation, Prioritized Packetization and Differentiated Forwarding" Aug. 21, 2001, Proceedings of the SPIE, SPIE, Bellingham, VA, US, vol. 4520, pp. 84-95 , XP008006103 abstract.

* cited by examiner

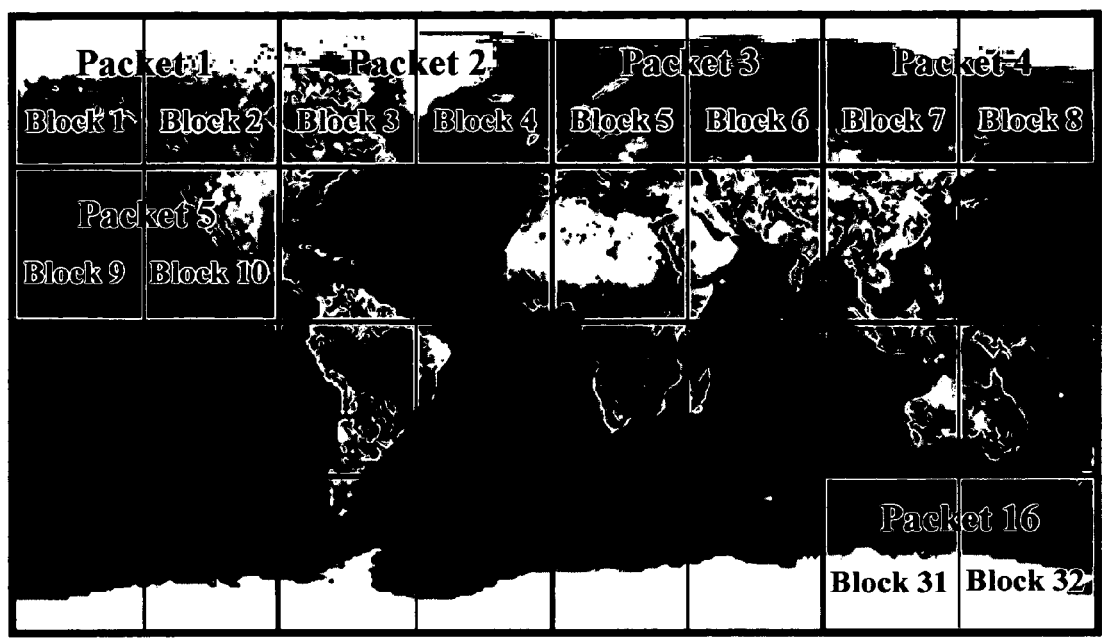
FIGURE 4. Image granularity. Transform blocks and packets.

```
<vtc_file xmlns:xsi="http://www.w3.org/2001/XMLSchema-instance"
 xmlns="urn:mpeg:mpeg4:vtc" xsi:schemaLocation="urn:mpeg:mpeg4:vtc VTC.xsd ">
<main_header>
   <start_marker>000001BE</start_marker>
   <tiling_disable>1</tiling_disable>
   <texture_error_resilience_disable>0</texture_error_resilience_disable>
   <texture_object_id>0</texture_object_id>
...
</main_header>
<packet>
 <header>
  <packet_marker>1</packet_marker>
  <first_TU_0>0</first_TU_0>
  <last_TU_0>0</last_TU_0>
 </header>
 <startPayload>64</startPayload>
 <payload>bitstream.vtc#20-148</payload>
</packet>
....
</vtc_file>
```

FIGURE 5. Fragment of BSDL Description for a VTC MQ-TD image.

```
<xs:element name="vtc_file">
 <xs:complexType>
  <xs:sequence>
   <xs:element name="main_header" type="vtc:main_headerType"/>
   <xs:element name="packet" type="vtc:packetType" maxOccurs="unbounded"/>
  </xs:sequence>
 </xs:complexType>
</xs:element>

<xs:complexType name="main_headerType">
 <xs:sequence>
  <xs:element name="start_marker">
   <xs:simpleType>
    <xs:restriction base="xs:hexBinary">
     <xs:length value="4"/>
    </xs:restriction>
   </xs:simpleType>
  </xs:element>
  <xs:element name="tiling_disable" type="vtc:1b"/>
  ...
 </xs:sequence>
</xs:complexType>
...
```

FIGURE 6. Fragment of the Schema for VTC MQ-TD mode.

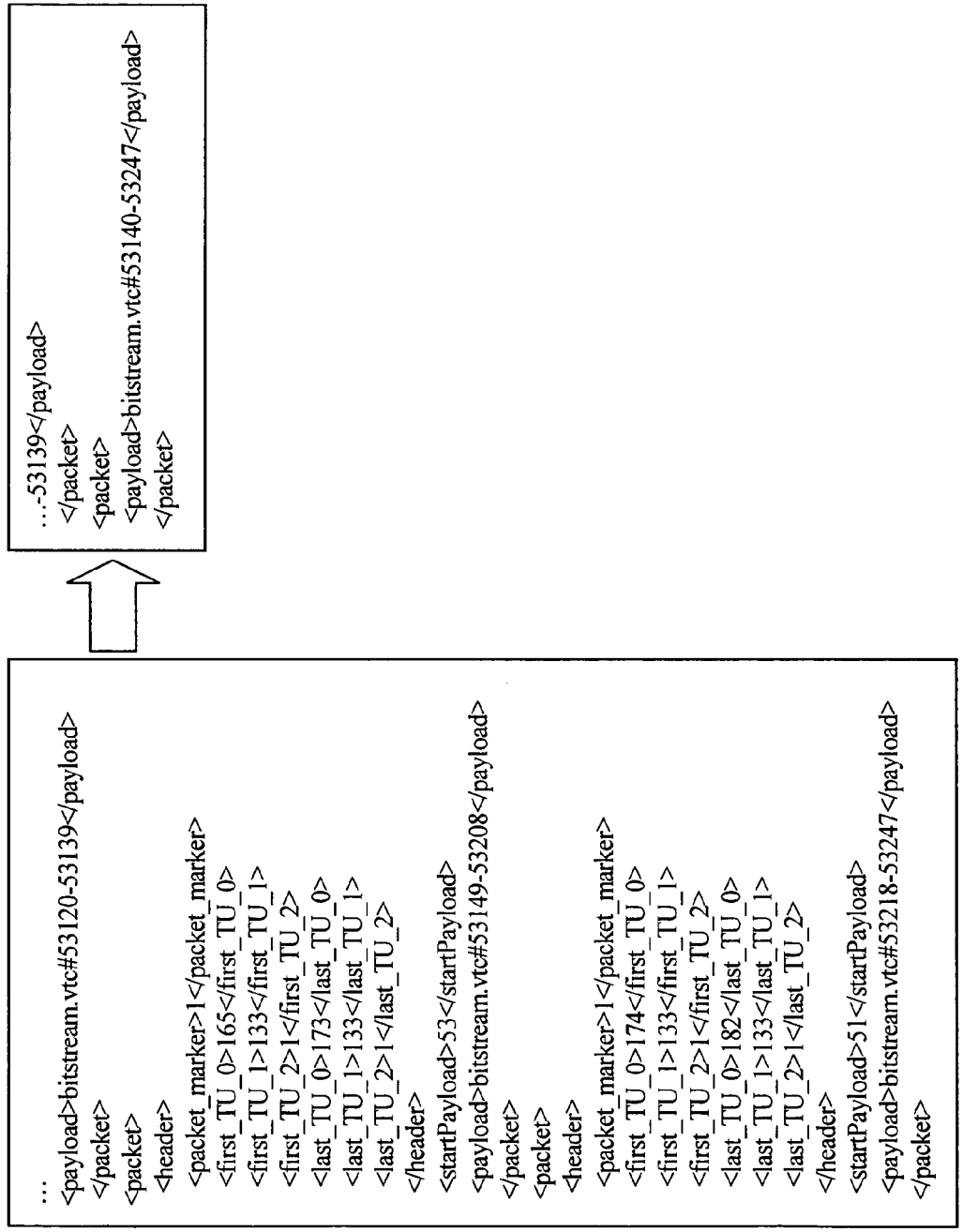
FIGURE 7. A reduced description of the packets.

```
<vtc_extended_info>
 <number_DC_packets>1</number_DC_packets>
 <number_layers>3</number_layers>
 <number_hor_packets>9</number_hor_packets>
 <number_ver_packets>30</number_ver_packets>
 <percentage_per_row>3.33</percentage_per_row>
 <percentage_per_col>11.11</percentage_per_col>
</vtc_extended_info>
```

FIGURE 8. Example of an extended information element for VTC.

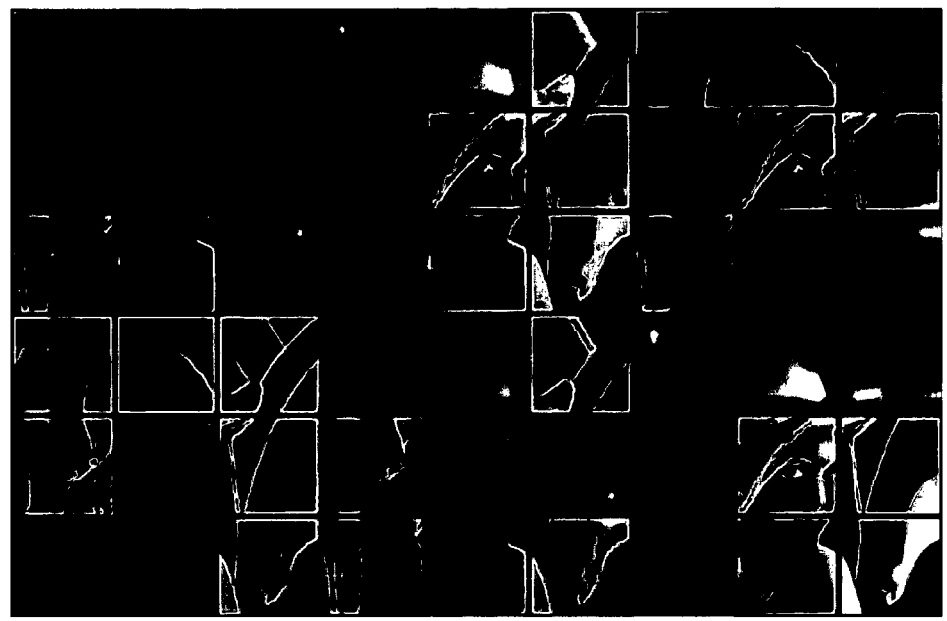
FIGURE 9. Scalability applied to Rubik's Cube-Lena image.
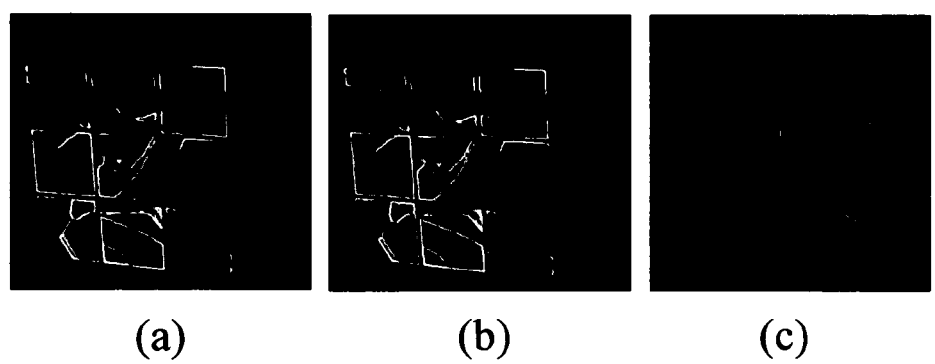
FIGURE 10. Rubik's Cube test case, (a) result with fully decoded texture, (b) result with view-dependent decoding, (c) invisible part of the cube.

```
<packet layer="1" row="76.66" col="88.88">
 <payload>bitstream.vtc#77469-77654</payload>
</packet> or

<packet idn="145" >
 <payload>bitstream.vtc#77469-77654</payload>
</packet>
```

FIGURE 11. Tagged packet for successive transformations in active networks.

METHOD FOR SYNTACTICALLY ANALYZING A BIT STREAM USING A SCHEMA AND A METHOD OF GENERATING A BIT STREAM BASED THEREON

RELATED APPLICATIONS

This application is a continuation application, and claims the benefit under 35 U.S.C. §§ 120 and 365 of PCT Application No. PCT/BE02/00178 filed on Nov. 26, 2002 and published on Jun. 5, 2003, in English, which is hereby incorporated by reference herein. The PCT application claimed the benefit from U.S. Provisional Application No. 60/333,645 filed on Nov. 26, 2001, which is hereby incorporated by reference.

BACKGROUND OF THE INVENTION

1. Field of the Invention

The invention relates to multimedia methods, devices and bit streams in particular those applying a high-level content description, by for instance using XML-like documents like in the so-called bit stream syntax description languages like BSDL or variants or derivatives thereof. The present invention particularly relates to image coding techniques wherein a block-based arrangement of the image is considered. The image coding technique generates a packetized bit stream. The present invention also relates to a description of an encoded bit stream, a method for transforming such a description so as to generate an adapted description and a method of generating an adapted encoded bit stream from an original encoded bit stream. The invention also relates to an electronic device designed for implementing such a method of transforming a description. The invention also relates to a transmission system comprising a transmitter and a receiver, the transmitter having means for implementing such a method generating an adapted encoded bit stream from an original encoded bit stream, and means for transmitting the adapted encoded bit stream to the receiver. The invention can be applied to images/video transmission.

2. Description of the Related Technology

Bit stream Syntax Description Languages (BSDL or similar) was introduced in: ["Bit stream Syntax Definition Language: an input to MPEG-21 Content Representation", ISO/IEC JTC1/SC29/WG11 MPEG01/IM7053, Singapore, March 2001] and [Sylvain Devillers, Myriam Caprioglio, "Bit stream Syntax Definition Language (BSDL)", ISO/IEC JTC1/SC29/WG11 MPEG01/M7433, Sydney, July 2001.] as an efficient and platform independent way to describe and adapt multimedia content. This XML-schema based languages allow describing the content of a multimedia file in a comprehensible and structured way that can be modified using XSLT and brought back to a binary form. The possibility of transforming multimedia files is very attractive from the point of view of content scalability.

Today, whereas streaming video is common practice, the streaming of 3D content remains rare, or even nonexistent. When decoding and rendering 3D content, the workload on the consumer's platform heavily varies over several orders of magnitude with the viewing conditions. As mostly only a part of the textured 3D objects is visible at any given time, streaming and/or decoding only the visible regions of the texture will reduce instantaneous bandwidth and/or platform workload. When the viewing conditions change, the newly visible parts can be streamed and/or decoded as they gradually become visible. Consequently, the required network bandwidth as well as the required workload for decoding and rendering textured 3D content are spread over time while minimizing the perceived quality loss. This process is known as view-dependent texture decoding [D. Cohen-Or, Y. Mann, S. Fleishman, "Deep Compression for Streaming Texture Intensive Animations," Proceedings of the SIGGRAPH 1999 annual conference on Computer graphics, pp. 261-267, 1999.].

Within the MPEG-4 multimedia compression standard ["The MPEG-4 Audio-Visual Compression Standard, Text of ISO/IEC 14496-5/FPDAM1," ISO/IEC JTC1/SC29/WG11/MPEG99/N3309, Noordwijkerhout, March 2000.], tools are available for coding 3D content. In particular, MPEG-4 provides a scalable, wavelet based, compression tool for textures, called Visual Texture Coding (VTC) [I. Sodagar, H. J. Lee, P. Hatrack, Y. Q. Zhang, "Scalable Wavelet Coding for Synthetic/Natural Hybrid Images," IEEE Transactions on Circuits and Systems for Video Technology, Vol. 9, No. 2, pp. 244-254, March, 1999.].

VTC allows the generation of a packetized bit stream with a high flexibility for defining the packet boundaries. Each packet consists of a number of basic units, called texture units (TU). A particular case in VTC is the multiple quantization, tree-depth mode (MQ-TD).

The maximum granularity provided in the MQ-TD mode is given by the number of wavelet transform levels. The number of pixels involved in the transformation increases as the size of the block is $2^{n\_levels} \times 2^{n\_levels}$. As error resilience introduces some overhead, limiting the granularity can reduce the size of the compressed image. Several transform spatial blocks can be grouped in a single packet instead of introducing an error resilience marker after each block. This can be useful when only coarse granularity is required.

Known multi-media formats tend to hide information, which can be vital for the multimedia content adaptation process, but is embedded in the bit stream.

A method for transforming a description of a bit stream is described in the international patent application WO 02/063494 filed by Koninklijke Philips Electronics N.V. The method described in this document includes:

using an original description of a bit stream written in a markup language, and a set of predefined transformations, applying one of the predefined transformations to the original description so as to generate an adapted description, generating an adapted bit stream from the adapted description.

In the method described in this document, the original description has to be detailed enough to allow recovering the coding information that is required for performing the transformations. Such a detailed description can be considerably verbose, and there is a need for descriptions that are easier to adapt. It would also be useful to have simpler and shorter descriptions.

SUMMARY OF CERTAIN INVENTIVE ASPECTS OF THE INVENTION

One aspect of the invention provides a method of transforming a description that allows easy adaptation. According to one embodiment, the element describing a group of data packets in the description has an attribute that contains a transformation tag. When transforming the original description, the transformation tags are checked versus a predetermined condition. The adapted description is generated by removing the elements which transformation tags do not satisfy the predetermined condition. One embodiment of the invention includes a description, for example embedded in a bit stream to be transmitted across a communications channel, the description being written in a mark-up language and containing an element, the element having at least one attribute containing a tag. The description may be a data structure stored on a memory device such as a CD-ROM, a DVD-optical disk, a diskette, a magnetic tape, a memory of a computing or in a memory of a network element of a telecommunications system. The tag may represent information describing at least a part of a hierarchical structure of a bit stream to be transmitted over a channel or an identification of a data packet in this bit stream. The information that is needed for a transformation is made available via the transformation tag. Another advantage of using such transformation tags, compared to the above-mentioned prior art, is that it allows increasing the transformation processing speed.

In a first embodiment of the invention, the encoded bit stream has a scalable format according to which several data layers are defined, and the transformation tag is an indication of the data layer to which the group of data packets belongs. The data layers can belong to a hierarchical structure, e.g. different data layers contain data relating to different resolutions or quality of an image. This first embodiment allows the obtaining of different qualities of a content, for instance to adapt to different terminals, e.g. different resolutions or bandwidths. Elements that belong to a higher data layer can be removed so as to generate a description of a bit stream of lower quality intended for terminals having lower capabilities (for instance low resolution displays of mobile phones).

In a second embodiment of the invention, the transformation tag is a packet(s) identifier, and the predetermined condition is a condition of membership of a set of packet identifiers associated to a specific transformation to be achieved. This second embodiment is advantageously used when several different transformations are defined. Each transformation includes a set of data packet(s) identifiers as a parameter, the packet(s) identifiers relating to those packets to be kept (or to be removed) from a bit stream after the transformation.

Advantageously transformations are performed by using stylesheets as known from BSDL, for example.

Another embodiment of the invention provides a schema more suited for adapting multimedia content, more in particular of successive adaptations of the bit stream or its related schema instance. A schema instance is a description of an encoded bit stream which has been generated from the schema. To obtain a adaptation/transformation of the bit stream an adapted description is generated. The generation of an adapted bit stream from the adapted description is advantageously done by using some aspects of a schema as described in the international patent application WO 02/069187 filed by Koninklijke Philips Electronics N.V. One embodiment of the invention, therefore, relates to a schema, a method for syntactic analyzing of a bit stream using the schema and a method of generating a bit stream based on the schema, the schema having the features, given in WO 02/069187 A1, except for the novel and inventive features of the invention. The schema describes a format for the structure of data in a bit stream representation. The schema approach is used for an efficient and a platform independent way of adapting multimedia content.

The above described schema approach defines a framework for describing the structure of a bit stream with a mark-up language such as an XML-like (for instance XML-based or XML-compliant) language and provides a generic approach for resource adaptation. User preferences can be taken into account in performing the adaptation. As a multimedia bit stream comprises a structured sequence of binary symbols, with a structure being specific to the coding format, the schema approach enables describing the high-level structure of a bit stream.

To avoid hiding information which can be vital for the multimedia adaptation process, the description includes, according to another aspect of the invention, specific elements containing useful information. These elements are generated either during the content encoding process, or afterwards from the encoded bit stream.

Advantageously, a schema is provided from which such a description can be derived. Such a schema has elements, for which it describes a name, a type of information, the information being embedded into the bit stream. Hence information is made explicit which requires complex computations for deriving them from the bit stream, more in particular this information is only obtainable when decoding part of the bit stream.

This is illustrated for an image coding technique, wherein first the image is divided into blocks. The image coding technique generates a packetized bit stream, hence within the bit stream a plurality of packets can be distinguished. How many blocks (one or more) of the image are to be encoded together in one packet can be selected. This implies that packets are stand-alone, meaning that no data dependencies exist between packets. Note that if transforms are applied on the image, overlaps can be necessary, for instance in case of sub band coding techniques like wavelet transforms, resulting in some data dependencies.

The schema for describing the structure of an image, according to the image coding technique described above, has as elements for each image a main header and portions, each portion related to a packet. These portions contain a reference to the related portion of the bit stream, this reference is also denoted the payload, and can for instance be specified in the form of an URL.

One embodiment of the invention provides an element, additional to the ones known from WO 02/069187, the element being used for describing so-called extended information.

As a further illustration the use of this extended information concept to an image coding technique, wherein the images are encoded in difference quality layers, is provided. In such an image coding technique, the quality of a layer depends on the quantization used on the pixels of the image and a transformation level. The information about the quantization used and the transformation level when using this image coding technique is also encoded in the bit stream, for instance in the first packet related to the quality layer. Such information can be the number of layers, the number of packets per layer, and the transformation level. Hence it is hidden inside the packets. Although the information is available, it is embedded in the bit stream. Note that the quality layer approach is based on grouping information to be included in the part of the bit stream related to that particular layer.

The additional element, which can complement the main header, can be used for describing the so-called extended information, about the quantization, like the number of layers, the number of packets per layer and the transformation level. Other possibilities are a marking of the contribution of the portion of the bit stream to a certain level of quality, level of resolution and the respective color component or similar.

The schema described above can be used for adapting multimedia content. The possibility of transforming multimedia files is needed if one wants to provide for content scalability. The schema adaptation approach works as follows: instead of directly adapting the bit stream, the schema-like description of the bit stream is modified, by use of so-called style sheets. Therefore, from the modified schema-like description the binary form (the adapted binary texture) file is generated.

When considering a block-based image coding technique, generating a packetized bit stream, hence within the bit stream a plurality of packets can be distinguished, one is faced with the problem that after successive transformations, the position of a packet in the bit stream does not correspond anymore with its related position in the image and the quality layer space. Again this could be solved by decoding parts of the bit stream wherein this position can be found, but this requires complicated computations.

According to one embodiment, the schema for describing the structure of an image, according to the image coding technique described above, has as elements for each image a main header and portions, each portion being related to a packet, and in the schema an additional attribute or tag for the packets is added. The additional attribute is such that one can easily derive the packets' position in the image. This is realized by either storing in the additional attribute the position or using an identification number for the packet. The additional attribute results in a sort of tagging of the packets.

Another aspect of the invention provides multimedia methods and devices, exploiting a high-level content description of bit streams, by using XML-like documents in the so-called bit stream syntax description languages like BSDL or variants or derivatives thereof, the invented methods and devices being characterized that the used descriptions are provided with extra special elements and attributes enabling efficient bit stream adaptations, which can be needed for instance in the case of visual texture coding, more in particular when considering 3-D objects and view-dependent coding.

BRIEF DESCRIPTION OF THE DRAWINGS

FIG. 4 shows image granularity and transformation of blocks and packets;

FIG. 5 shows a fragment of BSDL Description for a VTC MQ-TD image;

FIG. 6 shows a fragment of the Schema for VTC MQ-TD mode;

FIG. 7 shows a reduced description of the packets;

FIG. 8 an example of an extended information element for VTC;

FIG. 9 shows scalability applied to Rubik's Cube-Lena image;

FIG. 10 shows a Rubik's Cube test case, (a) result with fully decoded texture, (b) result with view-dependent decoding, (c) invisible part of the cube;

FIG. 11 shows a tagged packet for successive transformations in active networks.

DETAILED DESCRIPTION OF CERTAIN EMBODIMENTS OF THE INVENTION

Figure 1:
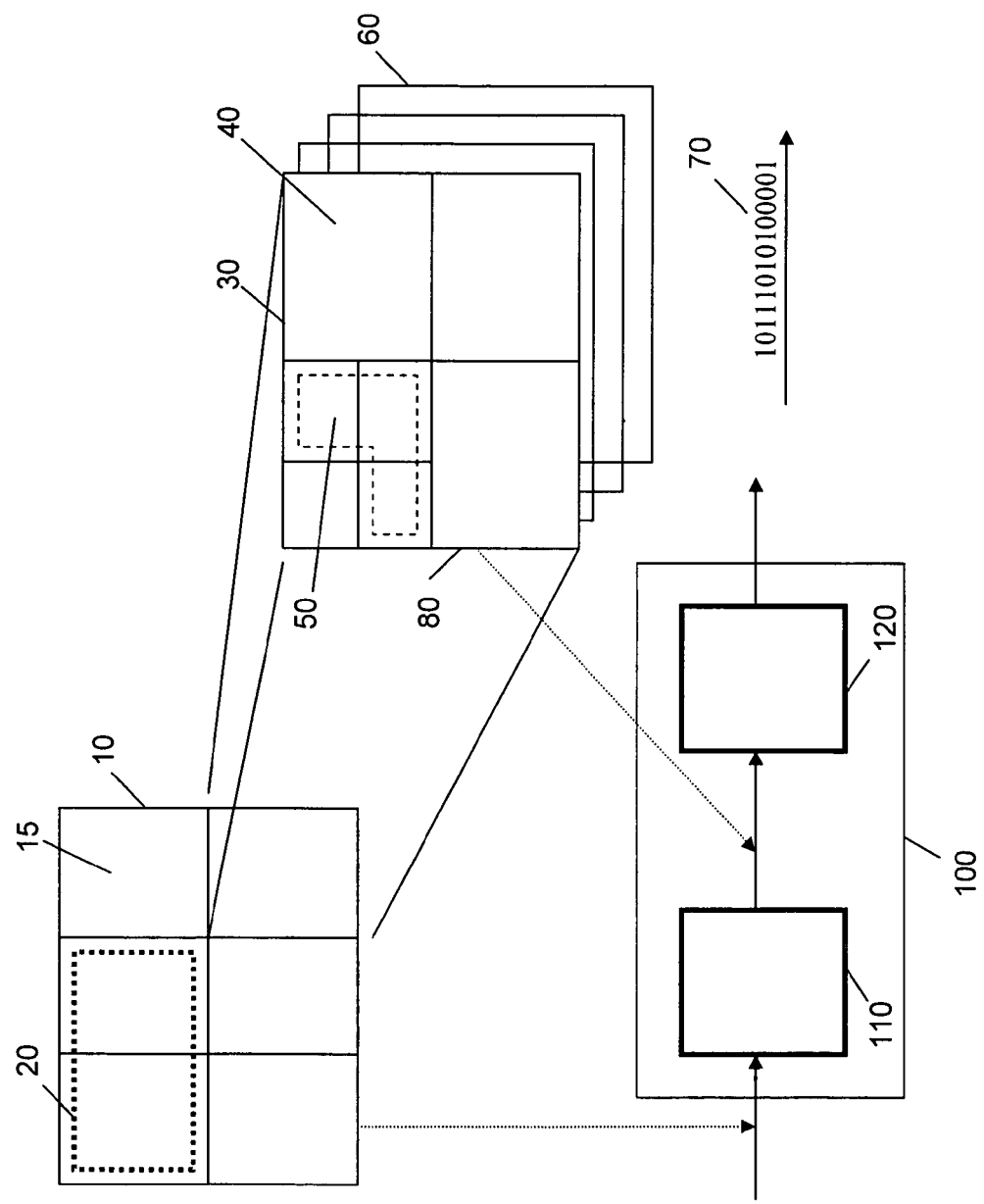
FIG. 1 is a block diagram of an example of an image coding technique.

The present invention will be described with reference to certain embodiments and drawings but is not limited thereto. The skilled person will appreciate that the present invention has wide application as defined in the attached claims.

One aspect of the invention relates to methods for syntactically analyzing a bit stream and methods of generating a bit stream, the methods use a certain format for a document representing the bit stream, the document being a tree-like representation of the bit stream.

The format (described in a so-called schema) defines one or more types of data, notably a type of data corresponding to binary segments of indefinite length. Further the schema comprises a plurality of elements for which it describes at least a name and a type of data.

The multi-media format of a bit stream defines which information is located where in the bit stream. By using the schema or the format defined thereby, one can construct a document, describing the structure of the bit stream. Besides data, the bit stream does also include information about the coding process used. The information is hence encoded within the bit stream.

When performing adaptations of the bit stream based on a higher-level representation, like the document made based on the schema, the embedded information remains hidden for the adaptation process, meaning decoding of that portion of the bit stream is needed if one wants or needs to exploit the information.

One embodiment of the invention provides a schema, more suited for adapting multimedia content. This is realized by a schema, allowing a format for describing the structure of the data, wherein at least part of this embedded information, can be made explicit. Hence the schema has special elements, for which it describes a name, a type of information, the information being embedded into the bit stream.

One aspect of the invention provides a method of generating an adapted bit stream from an original bit stream. In one embodiment, the method comprises receiving the original bit stream and ii) syntactically analyzing the original bit stream containing data which have a structure according to a certain format, the analyzing, generating a tree-like representation of the original bit stream. In one embodiment, the generating comprises i) reading a schema for generically describing the format, comprising a plurality of elements for which it describes a name and type of data, and a special element related to information, related to the coding method, ii) searching in the original bit stream for the data that correspond to the elements (including the special element) contained in the schema, iii) generating an instance of the schema which contains the data found in the original bit stream and which constitutes the tree-like representation, the instance further including explicit information, which is embedded in the original bit stream, iv) generating an adapted instance of the schema, the adaptation process exploiting the explicit information and v) finally generating the adapted bit stream from the adapted instance.

This is now illustrated (FIG. 1) for an image coding technique (100), wherein first the image (10) is divided into blocks (15). The image coding technique generates a packetized bit stream (70), hence within the bit stream a plurality of packets (75) can be distinguished. One can select how many blocks (one or more) (for instance selection (20)) of the image are encoded together in one packet.

Further the image coding or encoding is not used on the original image but on a transformed version of the image. A possible type of used transforms are sub band transforms, like wavelet transforms. Within the image coding technique one can hence find a transform step (110) and a step (120) of coding the transformed image (80). Applying the transform step results in a image (30) decomposed in sub bands (40).

The image encoding technique will typically work on a (transformed) portion of the image (for instance a block). In FIG. 4, the division of an image in blocks is shown. The block size is derived from the number of transform levels. In the case of this example, packets are built up of two blocks. Packets are standalone, without data dependencies with the other packets. The size of the packets determines the granularity. Note that this is only true for the horizontal dimension, as blocks cannot be packed in a column wise fashion. Further, the images (or the transformed portions thereof) are encoded in difference quality layers, meaning one will implicitly select which sub band of the transformed portion is used and one will implicitly select the degree of quantization (see the different bit planes (60)) used on the pixels of the selected sub band portions. These selections or groupings (see for instance selection (50)) define a certain quality. If the original image would be displayed after decoding the portion of the bit stream related to that quality layer, a certain predefined quality can be expected.

The quality of a layer depends on the quantization used on the pixels of the image and transformation level, more in particular which subbands are included. The information about the quantization used and the subbands when using this image coding technique is also encoded in the bit stream, for instance in the first packet related to the quality layer. Of course other parameterizations of substantially the same information can be used.

The schema for describing the structure of a image, according to the image coding technique described above, has as elements for each image a main header and portions, each portion related to a packet. These portions contain a reference to the related portion of the bit stream, this reference is also denoted the payload, and can for instance be specified in the form of an URL.

One embodiment of the invention provides a special element additional to the ones discussed above, the element being used for describing so-called extended information. Such information can be the number of layers, the number of packets per layer, and subbands used. Hence it is hidden inside the packets. Although the information is available, it is embedded in the bit stream.

Figure 2:
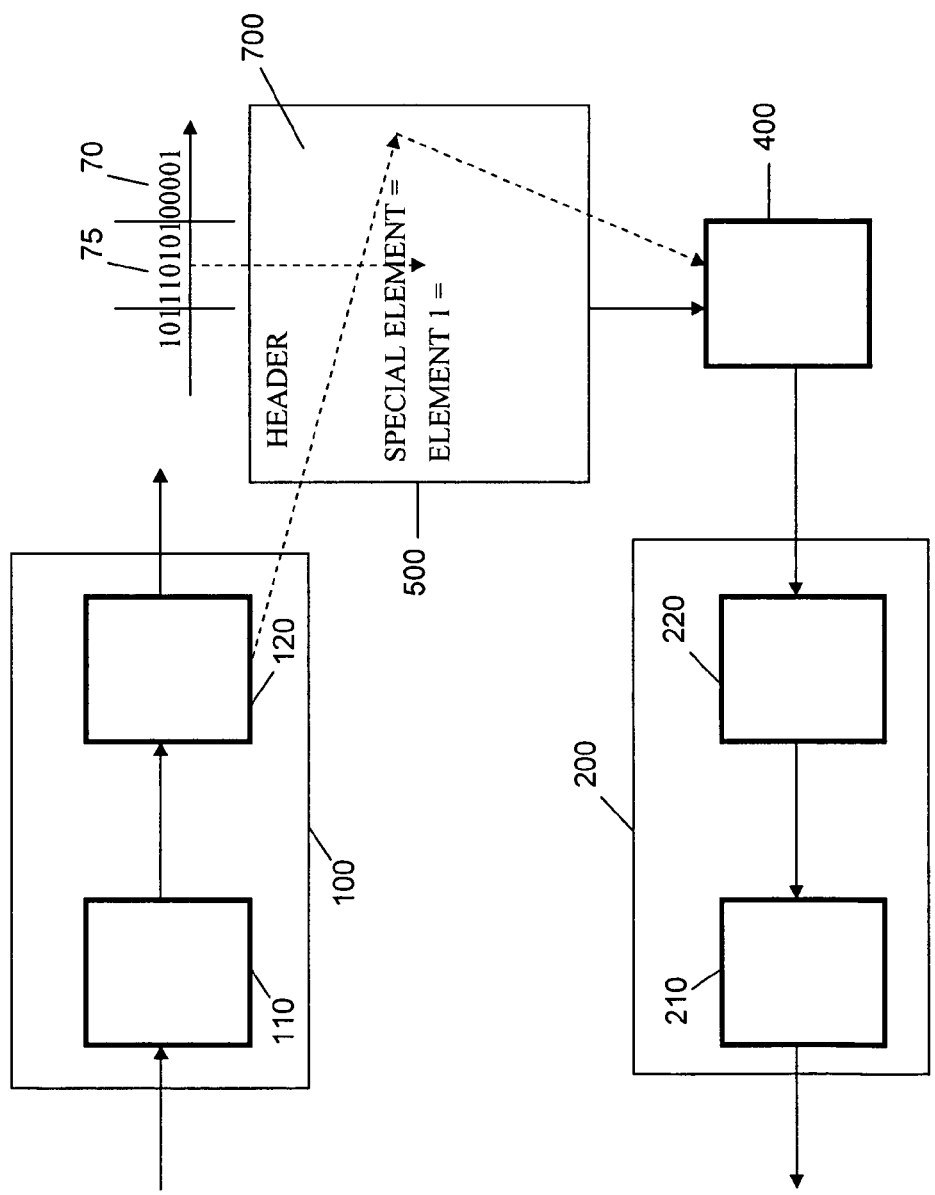
FIG. 2 is a block diagram of an example of a method including generation of an encoded bit stream, generation of an instance that is tree representation of the encoded bit stream, adaptation of the instance, generation of an adapted bit stream, and decoding of the adapted bit stream.
Figure 3:
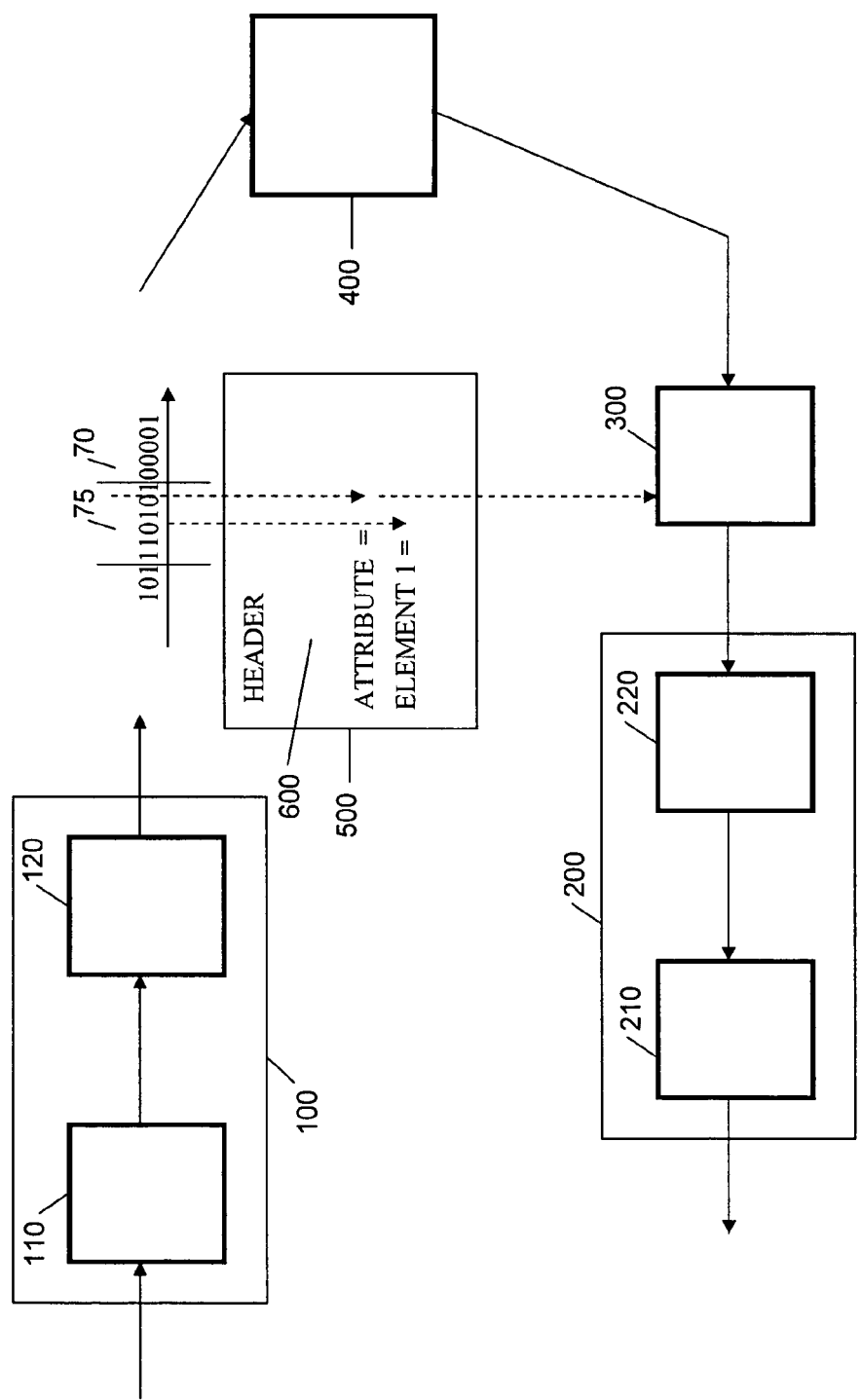
FIG. 3 is a block diagram of an example of another method including generation of an encoded bit stream, generation of an instance that is tree representation of the encoded bit stream, adaptation of the instance, generation of an adapted bit stream, and decoding of the adapted bit stream including a region of interest selection.

Referring to FIG. 2, instead of operating on the bit stream directly, one embodiment of the invention generates an instance (500) of the schema which contains the data found in the original bit stream and which constitutes the tree-like representation, the instance further including explicit information (700), which is embedded in the original bit stream One embodiment of the invention provides for an element additional to the ones discussed above, which should complement the main header, the element being used for describing so-called extended information, generated by the image coding, on the quantization, like the number of layers, the number of packets per layer and the transformation level.

The direct availability of the extended information allows for exploiting the extended information is the process (400) of constructing an adapted instance. From the adapted instance the inverse process of the image coding (200), with sub steps of image decoding (220) and inverse transforming (210), are performed.

One aspect of the invention provides a method of generating an adapted bit stream from an original bit stream, the original bit stream being the result of applying a coding method on at least a portion of an image. In one embodiment, the method comprises receiving the original bit stream and syntactically analyzing the original bit stream containing data which have a structure according to a certain format, the analyzing generating a tree-like representation of the original bit stream. In one embodiment, the analyzing comprises i) reading a schema for generically describing the format, comprising a plurality of elements for which it describes a name and type of data, and a special element related to information, related to the coding method, ii) searching in the original bit stream for the data that correspond to the elements (including the special element) contained in the schema, iii) generating an instance of the schema which contains the data found in the original bit stream and which constitutes the tree-like representation, the instance further including explicit information, which is embedded in the original bit stream, iv) generating an adapted instance of the schema, the adaptation process exploiting the explicit information and v) finally generating the adapted bit stream from the adapted instance.

In an embodiment thereof the coding method includes sub band transforming of a portion of an image.

In an embodiment thereof the coding method includes defining quality layers and selecting per quality layer, which sub bands of the portion of the image are included for coding and the explicit information indicates the sub bands and the grouping of bit planes.

In an embodiment thereof the coding method includes defining quality layers and selecting per quality layer, which degree of quantization is used on the portions of the image being selected for the quality layer; and the explicit information indicates the quantization degree.

The schema can be used for adapting multimedia content. The possibility of transforming multimedia files is needed if one wants to provide for content scalability. The schema adaptation approach works as follows: instead of directly adapting the bit stream, the schema like description of the bit stream is modified, by use of so-called style sheets. Therefore from the modified schema like description the binary form (the adapted binary texture) file is generated.

When considering a block-based image coding technique, generating a packetized bit stream, hence within the bit stream a plurality of packets can be distinguished, one is faced with the problem that after successive transformations, the position of a packet in the bit stream does not correspond anymore with its position in the image.

Note that in case one wants to display a particular region of interest of the original image, the original bit stream one could easily select the related packet as the image coding technique uses a predefined scanning through the image for generating the original bit stream. Alternatively one could determine the related packet based on the information available in the bit stream but this requires decoding and hence complex computations.

Another embodiment of the invention provides a schema, more suited for adapting multimedia content, in particular in the case of successive adaptations of bit streams, for instance in the network.

The schema for describing the structure of an image, according to the image coding technique described above, has as elements for each image a main header and portions, each portion related to a packet, and in the schema an additional attribute (600) for the packets is added. The additional attribute is such that one can easily derive its position in the image. This is realized by either storing in the additional attribute the position or using an identification number for the packet. The additional attribute results in a sort of tagging of the packets.

Hence in case one wants to display a particular region of interest of the adapted image (hence from the bit stream after adaptation (400)), one exploits in the required packet selection step (300) the additional attribute as the predefined scanning through the image can not be re-used due to the modifications on the bit stream. The additional attribute can be used to trace the packet in the adapted bit stream for allocating the packet and for determining its quality level. Note that the region of interest display process again a schema based approach will be used.

One aspect of the invention provides a method of displaying a portion of an image from a bit stream generated from an instance of a schema, which constitutes a tree-like representation of the data, the instance contains the data found in bit stream, the bit stream being the result of applying a coding method on at least a portion of an image and applying transformations on the result, the bit stream further comprising a plurality of packets. In one embodiment, the instance of the schema includes an additional attribute for the packets, the additional attribute indicating the position of the packet in accordance to a predefined scanning procedure related to the coding method and the displaying comprises selecting at least one packet based on the attribute.

A particular realization of one embodiment of the invention is now further described.

The Bit stream Syntax Description Language (BSDL) described in the international patent application WO 02/069187 is an efficient and platform independent way to describe and adapt multimedia content. This XML-schema based language allows describing the content of a multimedia file in a comprehensible and structured way that can be modified using XSLT and brought back to a binary form. The possibility of transforming multimedia files is very attractive from the point of view of content scalability. In the context of MPEG-4 AFX, the use of error resilience markers is being studied to allow scalability in VTC [see Eric Delfosse, Gauthier Lafruit, "The use of VTC error resilience for view-dependent texture decoding", ISO/IEC JTC1/SC29/WG11/MPEG2001/m7580, Pattaya, December 2001].

An exemplary embodiment of the invention that will be described below relates to a BSDL implementation that allows to select different quality levels for an arbitrary number of regions in a VTC file. The aim of this process is to enable network QoS in 3D applications by transmitting only the information that is needed for decoding at a certain moment. However, The invention is not restricted to this specific embodiment.

Today, whereas streaming video is common practice, the streaming of 3D content remains rare, or even nonexistent. When decoding and rendering 3D content, the workload on the consumer's platform heavily varies over several orders of magnitude with the viewing conditions [see G. Lafruit, L. Nachtergaele, K. Denolf, J. Bormans, "3D Computational Graceful Degradation," Proceedings of ISCAS-Workshop and Exhibition on MPEG-4, pp. III-547-III-550, May 28-31, 2000].

As mostly only a part of the textured 3D objects is visible at any given time, streaming and/or decoding only the visible regions of the texture will reduce instantaneous bandwidth and/or platform workload. When the viewing conditions change, the newly visible parts can be streamed and/or decoded as they gradually become visible. Consequently, the required network bandwidth as well as the required workload for decoding and rendering textured 3D content are spread over time while minimizing the perceived quality loss. This process is known as view-dependent texture decoding [see D. Cohen-Or, Y. Mann, S. Fleishman, "Deep Compression for Streaming Texture Intensive Animations," Proceedings of the SIGGRAPH 1999 annual conference on Computer graphics, pp. 261-267, 1999].

Within the MPEG-4 multimedia compression standard [see "The MPEG-4 Audio-Visual Compression Standard, Text of ISO/IEC 14496-5/FPDAM1," ISO/IEC JTC1/SC29/WG11/MPEG99/N3309, Noordwijkerhout, March, 2000], tools are available for coding 3D content. In particular, MPEG-4 provides a scalable, wavelet based, compression tool for textures, called Visual Texture Coding (VTC) [see I. Sodagar, H. J. Lee, P. Hatrack, Y. Q. Zhang, "Scalable Wavelet Coding for Synthetic/Natural Hybrid Images," IEEE Transactions on Circuits and Systems for Video Technology, Vol. 9, No. 2, pp. 244-254, March 1999].

In one embodiment of the invention, the use of error resilience markers to allow scalability in VTC in the context of MPEG-4 AFX is disclosed. [Eric Delfosse, Gauthier Lafruit, "The use of VTC error resilience for view-dependent texture decoding", ISO/IEC JTC1/SC29/WG11/MPEG2001/m7580, Pattaya, December, 2001 which is incorporated herein by reference].

The error resilience features of VTC can be exploited for view-dependent texture decoding. Using the error resilience markers allows the generation of a packetized bit stream with a high flexibility for defining the packet boundaries. Each packet consists of a number of basic units, called texture units (TU). Each packet consists of a number of basic units, called texture units (TU). We will focus on the most interesting case in VTC, the multiple quantization, tree-depth mode (MQ-TD).

One embodiment of the invention is further illustrated for the multiple quantization, tree-depth mode (MQ-TD). The maximum granularity provided in the MQ-TD mode is given by the number of wavelet transform levels. The number of pixels involved in the transformation increases as the size of the block is $2^{n\_levels} \times 2^{n\_levels}$. As error resilience introduces some overhead, limiting the granularity can reduce the size of the compressed image. Several transform spatial blocks can be grouped in a single packet instead of introducing an error resilience marker after each block. This can be useful when only coarse granularity is required.

In MPEG-4 VTC, an image is divided in blocks. The block size is derived from the number of transform levels. In the case of this example, packets are built up of two blocks. Packets are standalone, without data dependencies with the other packets. The size of the packets determines the granularity. Note that this is only true for the horizontal dimension, as blocks cannot be packed in a column wise fashion.

Another embodiment of the invention provides a BSDL implementation thereof that allows to select different quality levels for an arbitrary number of regions in a VTC file. This process is to enable network QoS in 3D applications by transmitting only the information that is needed for decoding at a certain moment.

The Bit stream Syntax Description Language can be applied to describe the structure of a VTC image. FIG. 5 shows a fragment of a typical description. Each image consists of a main header and a collection of packets. Each packet contains information about which TU's are included in the packet and a payload as a URL. From this description is possible to generate the original binary file. The description elements are declared in the schema, along with their type definition. A fragment of the Schema is shown in FIG. 6. The description can be generated from a VTC binary file or can be generated by the VTC encoder as the binary file is created. The first option uses the BintoXML parser and the Schema to identify the different elements.

The BSDL type implementation of VTC can be formally described as a way of using a schema for describing the structure of a image, the schema having as elements for each image a main header and portions, each portion related to a packet. These portions contain a reference to the related portion of the bit stream, this reference is also denoted the payload, and can for instance be specified in the form of an URL.

As it has been found that a complete BSDL description can be considerably verbose when a low-level detail is needed, and thence the description can be too detailed for the target application. Therefore, one embodiment of the invention provides for reducing the description to the most relevant elements, thereby obtaining a simpler, shorter and easier to transform description.

A shorter description can be obtained in two ways:
1. Packet structure is not detailed. The header is merged with the payload.
2. If the texture has been encoded providing more granularity than needed, packets can be grouped.

An example of both procedures is shown in FIG. 7. Two packets are put together and the limits of the payload are changed to embrace both of them. Note that the simplified description is still conforming to the same schema.

The VTC format hides some vital information about quantization inside the packets. This kind of information should be available in the main header of the file, but it is embedded into the bit stream. As an example, the quantization steps are encoded in the first packet of every quality layer. The number of layers and the number of packets per layer are vital information, but require complex computations to know them.

As a solution to facilitate the utilization of BSDL in VTC, one embodiment of the invention includes an additional element in the description, detailing important information about the texture that cannot be obtained easily. This new element can be generated during encoding or directly from BSDL Description, for example with an XSLT style sheet. This extended information is ignored by the XMLtoBin parser and is processed only by the XSLT style sheet. An example of such an extended information is shown in FIG. 8.

XSLT style sheets are used to transform the BSDL Descriptions, and hence obtain an adapted version of the content. Transformation stylesheets have been designed to select an arbitrary number of regions inside the image specifying quality settings for each of them. Afterwards, the XMLtoBin parser uses the Schema to generate an adapted binary texture file. Region limits are specified as percentages of the total size of the image. The stylesheet selects the minimal amount of packets to cover the region given the available granularity. This procedure allows scaling the textures to the desired quality level, providing network QoS. The transformation can happen in two different manners.

First, a scaled version of the texture is requested by the client. This is a standalone VTC-compliant texture file.

Additionally, when the displaying conditions change, the client can request additional quality for some regions. In this case, only some packets are sent.

As only essential information is sent, and only when needed, optimal usage of the bandwidth is done. As the VTC format has been designed to be scalable, decoder QoS is possible. Moreover, by transmitting only relevant information, network QoS is also possible.

An example of this procedure is shown in FIG. 9 and FIG. 10. In this test case, a Rubik's Cube© is wrapped with the Lena image. As not all the tiles are visible at the same time, not all the information has to be transmitted and decoded. FIG. 9 shows how the image is transmitted in 4 different quality levels, ranging from only DC to lossless. In FIG. 10, the Cube rendering can be seen. Part (a) of the figure shows the Cube rendered using the full-quality texture. Part (b) uses FIG. 9 texture, taking advantage that only the front face must be rendered at full quality, while the right and top faces can be rendered at lower quality settings. The part of the Cube that is not visible is just rendered using the DC component (FIG. 10 (c)).

It is a common belief in the scientific community that active networks will pop up in the following years as a way to enhance the efficiency of communications. A possible scenario for 3D graphics and BSDL could be the following:

"A 3D scene or movie is being broadcasted. Rendering is performed at the terminal side but the characteristics of the terminals are heterogeneous. The server transmits textures adapting the quality to the current point of view. The quality is meant for high-capabilities terminals and the network will adapt the content to the different terminals. The server side provides the texture to the network nodes together with the BSDL code. Thus, a mobile phone operator will apply a further transformation in order to reduce the quality according to the low-resolution displays of mobile phones."

In this scenario, if successive transformations are applied, the position of a packet in the bit stream does not correspond anymore with its position in the image. This way, the allocation and quality level of a packet can be difficult to trace. In this case, packets must be tagged. This can be done by including an attribute or set of attributes to each packet. An example is shown in FIG. 11.

In the top example of this figure, the elements of the description comprise:
a first transformation tag containing an indication of the data layer to which the group of packets belongs,
a second and a third transformation tags containing the position of the group of packets in the image.

This is because in the above described application, both the quality layer and the position in the image are taken into account in order to decide which packet(s) to remove when generating an adapted description.

Of course, for other applications and other encoding formats, the elements may only comprise a transformation tag containing an indication of the data layer.

For instance, a description including such transformation tags is scanned in order to remove all packets for which the data layer indication is higher than "1".

In the bottom example of FIG. 11, the elements of the description comprise a single transformation tag containing a packet(s) identifier.

In this case, a set of packet(s) identifiers is to be defined for each possible transformation. When a specific transformation is applied, the description is scanned, and the elements which transformation tags do not belong to the set of packets identifiers defined for that specific transformation are removed. (Of course it is also possible to define sets of packets identifiers to be removed, and to remove the elements which transformation tags belong to the set of packets identifiers defined for that specific transformation).

It is to be understood that this first aspect of the invention is not restricted to the example described above (MPEG-4 VTC). In particular, it is applicable to other two-dimensional image or video encoding format.

It is to be noted that the transformation tag has to be introduced in the description as an attribute only if the adapted bit stream is to be generated from the adapted description by using the schema as described in WO 02/069187 because attributes are ignored by the XML-to-Bin parser). Otherwise, it can be introduced as an element.

As conclusion it can be stated that one embodiment of the invention provides essential features like extra elements and attributes to BSDL-like approaches for allowing powerful and platform independent content scalability for multimedia applications as illustrated for MPEG-4 VTC. Region and quality selection can be performed taking full advantage of the available granularity. Content adaptation using BSDL allows distributing the QoS management over the server, the network elements and the terminal.

The invented features (extra element and special attributes) of the schema can be used in methods for generating an instance of the schema, in a method for generating adapted bit streams and/or in methods for displaying regions of interest of an image. Further the features can be used in devices for image encoding, providing a bit stream and such instances, network node devices, adapting bit streams and/or an image displaying terminal, performing region of interest selection.

Note that such image coding or encoding apparatus will comprise of a hardware portion, being configured for encoding and generating an instance of the schema. The hardware portion can either be customized therefore or a programmable processor or combinations thereof. Similar considerations can be made for the hardware portion of a network node device, which will be provided for generating adapted bit streams and adapted instances of the schema. Also the hardware portion of an image displaying terminal can be either customized and/or programmed for performing region of interest packet selection steps and decoding.

The devices will have storage means for storing an instance of the schema, the storage means, which can be any physical storage entity, will be configured for storing an instance with either at least one special element and/or at least one attribute. Also storage space for storing a schema with special elements and attributes will be foreseen.

In an embodiment the image coding apparatus will code a hardware portion configured for encoding an image in a bit stream and the hardware portion will be capable of including coding parameters of importance for a certain packet within the instance of the schema that it generates.

In an embodiment of the network node device means for receiving or generating an instance of the schema are provided and the hardware portion of the device will be configured such that it can exploit the explicit information within the received or generated instance.

In an embodiment of the image displaying terminal besides a means for indication the region of interest of the image, a means for receiving or generating an instance of the schema will be provided and the hardware portion of the device will be configured such that it can exploit the explicit attributes within the received or generated instance.

Figure 12:
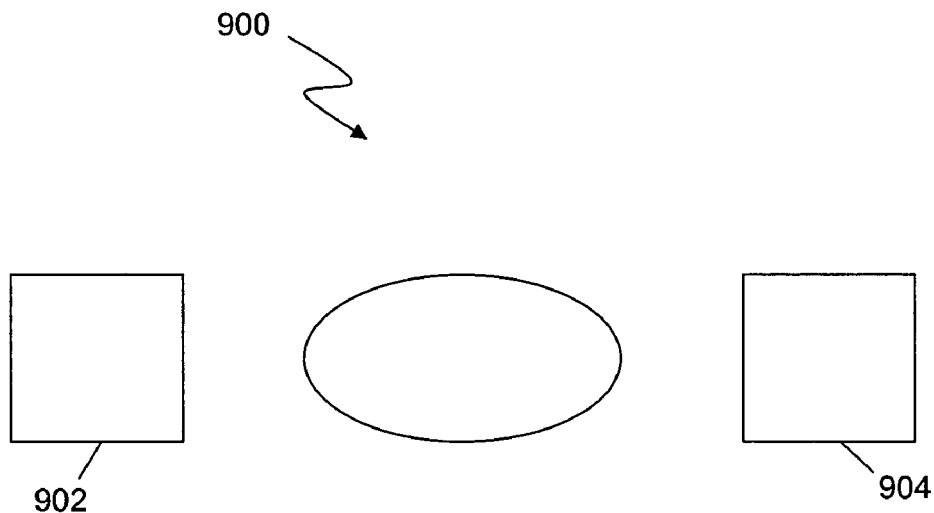
FIG. 12 is a block diagram of a transmission system according to an embodiment of the invention.

A transmission system 900 according to another aspect of the invention is represented in FIG. 12. It comprises a transmitter 902 and a receiver 904. Image coding, description transformation, and adapted bitstream generation are performed at the transmitter side, while image decoding is performed at the receiver side. The transmitter and receiver comprise memory means and processing means. One embodiment of the invention is implemented by way of software stored in the memory means and executed by the processing means. The software can be, for example, a computer program written in C, C++ or similar, and compiled for a specific microprocessor. Another embodiment of the invention includes a data carrier storing the program, e.g. diskettes, a CD-ROM, a magnetic tape or a memory in a telecommunications network or within a computing device. The data carrier executes a method in accordance with one embodiment of the invention when loaded onto the computing device.

The computer program executes a method in accordance with one embodiment of the invention, in particular any claimed method, when loaded into a microprocessor such as a Pentium IV microprocessor supplied by Intel Corp. or into another suitable processing engine such as a Programmable Logic Array (PLA), Programmable Array Logic (PAL), a programmable gate array such as a Field Programmable Gate Array (FPGA). The processing engine may be included in a suitable computing device having memory not only such as a personal computer or a UNIX workstation but also a mobile telephone, a Personal Digital Assistant (PDA), or embedded in a VLSI or for example in an accelerator card suitable for use with a personal computer or a video projector or other display device. One embodiment of the invention also includes a dedicated module, e.g. in the form of a VLSI, ASIC which is dedicated to carry out methods in accordance with one embodiment of the invention.

While the above description has pointed out novel features of the invention as applied to various embodiments, the skilled person will understand that various omissions, substitutions, and changes in the form and details of the device of the device or process illustrated may be made without departing from the scope of the invention. Therefore, the scope of the invention is defined by the appended claims rather than by the foregoing description. All variations coming within the meaning and rage of equivalency of the claims are embraced within their scope.

What is claimed is:

1. A method of transforming a description of an encoded bit stream, the encoded bit stream comprising data packets, the description being written in a markup language, a group of one or more data packets being described in the description by an element, the element having at least one attribute containing a transformation tag, the method comprising:
   scanning the description to check for a transformation tag in accordance with a predetermined condition;
   generating an adapted description in which the elements, in which a transformation tag does not satisfy the predetermined condition, are removed; and
   generating an adapted encoded bit stream from the adapted description;
   wherein the encoded bit stream has a scalable format according to which several data layers are defined, and the transformation tag comprises an indication of the data layer to which the group of one or more data packets belongs; and
   wherein the transformation tag further comprises a packet identifier, and the predetermined condition is a condition of membership of a set of packet identifiers associated with a specific transformation to be achieved.

2. A method of generating the adapted encoded bit stream from an original encoded bit stream, the original encoded bit stream comprising data packets, the method comprising:
   transforming a description, written in a markup language, of the original encoded bit stream so as to generate the adapted description, by applying the method of transforming a description as claimed in claim 1; and
   generating the adapted bit stream from the adapted description.

3. A transmission system comprising a transmitter and a receiver, the transmitter having means for implementing a method as claimed in claim 2 of generating an adapted encoded bit stream from an original encoded bit stream, and means for transmitting the adapted encoded bit stream to the receiver.

4. An electronic device comprising a memory storing a description of a bit stream, and processing means for implementing a method of transforming the description as claimed in claim 1.

5. A program comprising instructions for implementing a method of transforming a description as claimed in claim 1, when the program is executed by a processor.

6. The method of claim 1, wherein the adapted encoded bit stream is generated from the adapted description by style sheets.

7. A description, written in a markup language, of an encoded bit stream comprising data packets, the description comprising elements for describing groups of one or more data packets, the elements having at least one attribute containing a transformation tag intended to be used to be checked versus a predetermined condition in order to adapt the description by removing some of the elements so that the encoded bit stream is modified to generate a modified encoded bit stream from the adapted descriptions;

wherein the encoded bit stream has a scalable format according; to which several data layers are defined, and the transformation tag comprises an indication of the data layer to which the group of one or more data packets belongs; and wherein the transformation tag further comprises a packet identifier, and the predetermined condition is a condition of membership of a set of packet identifiers associated with a specific transformation to be achieved.

8. The description as claimed in claim 7, wherein the encoded bit stream has a scalable format according to which several data layers are defined, and the transformation tag is an indication of the data layer to which the group of data packets belongs.

9. The description as claimed in claim 7, wherein the transformation tag is a packet identifier, and the predetermined condition is a condition of membership of a set of packet identifiers associated to a specific transformation to be achieved.

* * * * *